(12) United States Patent
Reischl et al.

(10) Patent No.: US 10,031,029 B2
(45) Date of Patent: Jul. 24, 2018

(54) METHOD AND DEVICE FOR DETERMINING A TEMPERATURE OF A GAS FLOWING PAST A SENSING ELEMENT

(71) Applicant: Robert Bosch GmbH, Stuttgart (DE)

(72) Inventors: Rolf Reischl, Prachaup Khiri Khan (TH); Andreas Kuehn, Ettlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 201 days.

(21) Appl. No.: 14/900,526

(22) PCT Filed: May 15, 2014

(86) PCT No.: PCT/EP2014/059955
§ 371 (c)(1),
(2) Date: Dec. 21, 2015

(87) PCT Pub. No.: WO2014/206633
PCT Pub. Date: Dec. 31, 2014

(65) Prior Publication Data
US 2016/0146674 A1    May 26, 2016

(30) Foreign Application Priority Data
Jun. 25, 2013 (DE) .................. 10 2013 212 013

(51) Int. Cl.
*G01K 7/00* (2006.01)
*G01K 1/00* (2006.01)
*G01K 13/00* (2006.01)
*G01K 1/20* (2006.01)
*G01K 7/42* (2006.01)
*G01K 13/02* (2006.01)
(Continued)

(52) U.S. Cl.
CPC .............. *G01K 1/20* (2013.01); *G01K 1/08* (2013.01); *G01K 7/16* (2013.01); *G01K 7/427* (2013.01); *G01K 13/02* (2013.01); *G01K 2013/024* (2013.01); *G01K 2205/02* (2013.01)

(58) Field of Classification Search
USPC ................................ 374/148, 208, 183, 185
See application file for complete search history.

(56) References Cited

U.S. PATENT DOCUMENTS 8,596,113 B2   12/2013 Matsumoto et al.
2012/0051396 A1* 3/2012 Matsunaga ......... F02D 41/1446
374/144
(Continued)

FOREIGN PATENT DOCUMENTS

EP    2 482 050       8/2012
JP    H09329503 A   12/1997

*Primary Examiner* — Mirellys Jagan
(74) *Attorney, Agent, or Firm* — Norton Rose Fulbright US LLP; Gerard Messina

(57) ABSTRACT

A method for determining a temperature of a gas flowing past a sensing element, the sensing element being situated in or on a housing. The method includes reading in a sensing element signal and a housing signal, the sensing element signal representing a temperature of the sensing element and the housing signal representing a temperature of the housing. The method also includes ascertaining the temperature of the gas using the sensing element signal, the housing signal and a thermal resistance of the housing as a function of a material and/or a shape of the housing.

18 Claims, 6 Drawing Sheets

(51) Int. Cl.
G01K 1/08 (2006.01)
G01K 7/16 (2006.01)

(56) References Cited

U.S. PATENT DOCUMENTS

| | | | | |
|---|---|---|---|---|
| 2012/0307863 A1* | 12/2012 | Tada | ...................... | G01K 13/02 |
| | | | | 374/144 |
| 2013/0167554 A1* | 7/2013 | Parsons | .................... | G01K 1/12 |
| | | | | 60/803 |
| 2013/0223478 A1* | 8/2013 | Landis | ..................... | G01K 1/08 |
| | | | | 374/144 |

* cited by examiner

FIG. 6
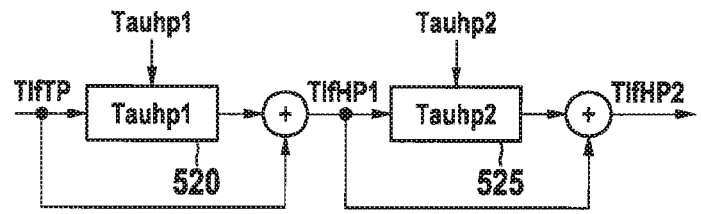
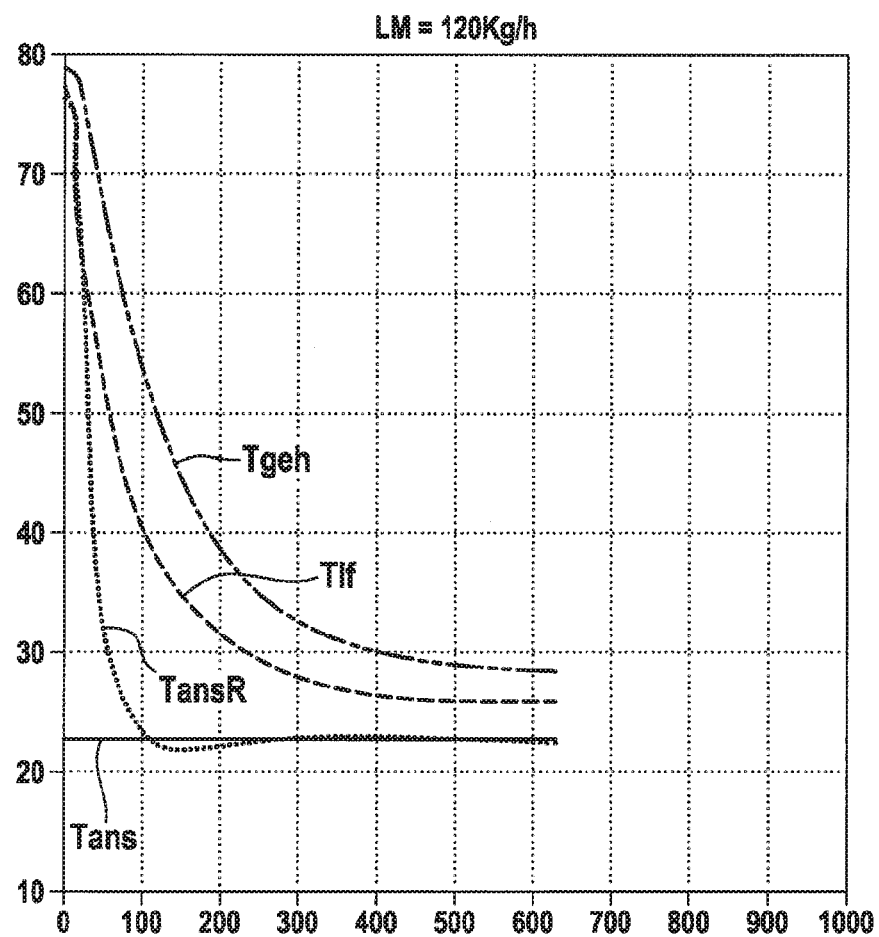
FIG. 7a

METHOD AND DEVICE FOR DETERMINING A TEMPERATURE OF A GAS FLOWING PAST A SENSING ELEMENT

FIELD OF THE INVENTION

The present invention relates to a method for determining a temperature of a gas flowing past a sensing element, to a corresponding device and to a corresponding computer program product.

BACKGROUND INFORMATION

An air sensor or a sensing element (as it is referred to in the following, for example, by the abbreviation Tlf) has the primary task of measuring the temperature of a sensor chip and to thus control the overtemperature of the air sensor diaphragm. The chip temperature in this case is in large measure a function of the temperature of the air passing through or over. Therefore, it is obvious to also use such an element as an air temperature sensor. However, such a sensor does not necessarily meet the requirements of an intake air temperature measurement, as is useful, for example, for measuring a temperature of air drawn in by an internal combustion engine. The causes for this lie with the narrow thermal coupling of the sensor to the plug-in sensor housing and to the high thermal time constant of the housing and of the sensor chip.

SUMMARY OF THE INVENTION

Against this background, a method is presented with the present invention for determining a temperature of a gas flowing past a sensing element, in addition to a device, which uses this method, and finally a corresponding computer program product as described herein. Advantageous embodiments result from the respective further sub-descriptions herein and the following description.

The approach presented herein provides a method for determining a temperature of a gas flowing past a sensing element, the sensing element being situated in or on a housing, the method including the following steps:

reading in a sensing element signal and a housing signal, the sensing element signal representing a temperature of the sensing element and the housing signal representing a temperature of the housing; and ascertaining the temperature of the gas using the sensing element signal, the housing signal and a (for example) previously known thermal resistance of the housing as a function of a material and/or a shape of the housing.

The approach presented herein also provides a device for determining a temperature of a gas flowing past a sensing element, the sensing element being situated in or on a housing, the device including the following features:

an interface for reading in a sensing element signal and a housing signal, the sensing element signal representing a temperature of the sensing element and the housing signal representing a temperature of the housing; and a unit for ascertaining the temperature of the gas using the sensing element signal, the housing signal and a (for example) previously known thermal resistance of the housing as a function of a material and/or a shape of the housing.

Thus, the present invention provides a device, which is configured to carry out or to implement the steps of a variant of a method presented herein in corresponding units. With this embodiment variant of the present invention in the form of a device as well, it is possible to quickly and efficiently achieve the object underlying the present invention.

A device in the present case may be understood to mean an electrical device, which processes sensor signals and, as a function thereof, outputs control signals and/or data signals. The device may include an interface, which may be provided as hardware and/or as software. In a hardware design, the interfaces may, for example, be part of a so-called system ASIC, which contains a wide variety of functions of the device. It is also possible, however, for the interfaces to be dedicated integrated circuits or to be made at least partly of discrete components. In a software design, the interfaces may be software modules, which are present, for example, on a microcontroller alongside other software modules.

Also advantageous is a computer program product having program code, which may be stored on a machine-readable medium, such as a semiconductor memory, a hard disk memory or an optical memory, and which is used for carrying out the method according to one of the previously described specific embodiments, when the program code is executed on a computer or a device.

A sensing element may be understood to mean a sensor in particular, a temperature sensor or a sensor in general, which provides a sensing element signal, which represents a temperature on a measuring surface or surface of the sensing element. A housing signal may be understood to mean a signal provided by a temperature sensor, which measures the temperature of the housing in or on which the sensing element is situated or attached. A thermal resistance may be understood to mean a (thermal) resistance between the sensing element and the temperature sensor providing the housing signal, which inhibits or prevents a spread of heat in a material. For this purpose, the material may be provided in a particular form or shape, which causes a particularly unfavorable transfer of heat such as, for example, a thinning of the material at a certain location in the housing.

The approach presented herein is based on the finding that a heat curve or a temperature of a gas may be quite accurately detected at one of the temperature sensors through the use of two temperature sensors or their signals, as well as of the thermal resistance located between the two temperature sensors. Here, it is possible to exploit the fact that with a change of temperature at a temperature sensor, such as the sensing element in the present case, a heat flow to the second temperature sensor, in this case the temperature sensor located in the housing or on the housing, may be determined and an inference may be drawn therefrom about heat acting on the first temperature sensor (in this case the sensing element).

The approach presented herein offers the advantage that it is now possible to determine a temperature of a gas relatively precisely with a technically very simple and cost-effective arrangement. Here, for example, presently available sensors may be used and their signals may continue to be skillfully used. This offers the advantage that, with knowledge of the temperature of the gas, it is also possible, for example, to determine other parameters significantly more precisely, in order, for example, to significantly improve a control of an internal combustion engine.

One specific embodiment of the present invention is particularly advantageous, in which the temperature is ascertained in the step of ascertaining using a thermal resistance of the gas flowing past the sensing element, the thermal resistance, in particular, being formed by a heat transfer from a solid body over which gas flows. Such a specific embodiment of the present invention offers the advantage of a particularly precise and exact determination of the temperature of the gas, since with the knowledge of an additional parameter in the heat flow between the gas via the first temperature sensor and the second temperature sensor, it is now possible to draw a very precise inference about the actual temperature of the gas flowing past the sensing element.

According to another specific embodiment of the present invention, the temperature of the gas is ascertained in the step of ascertaining using the thermal resistance, which is a function of one flow parameter of the gas flowing past the sensing element, in particular, of the velocity of the gas flowing past the sensing element. In the process, the flow parameter of the gas flowing past the sensing element may be read in the step of reading in and, in the step of ascertaining, the temperature of the gas may be ascertained as a function of the flow parameter. Such a specific embodiment of the present invention offers the advantage of a particularly precise determination of the thermal resistance of the gas flowing past the sensing element, as a result of which a particularly precise temperature measurement of the gas flowing past the sensing element is also possible.

One specific embodiment of the present invention is advantageous, in which the temperature of the gas is ascertained in the step of ascertaining using an empirically ascertained temperature offset at the sensing element, in particular, the temperature offset being a function of an air mass and/or a temperature of the sensing element. Such a specific embodiment of the present invention offers the advantage that when ascertaining the temperature offset at the sensing element, it is possible to also draw an exact inference about the thermal inertial (time constant) of the sensing element as a function of the air mass.

To implement a very rapidly settling measuring system, it is possible according to another specific embodiment of the present invention to filter, in particular high-pass filter, the sensing element signal by a further processing in the step of ascertaining.

Such a rapidly settling measuring system may be technically particularly simple to implement if, in the step of ascertaining, the sensing element signal is differentiated in order to obtain a differentiated sensing element signal, the temperature of the gas being ascertained on the basis of a sum signal from a sum of the sensing element signal and the differentiated sensing element signal. In this case, the time constant of the high pass is dimensioned in such a way that it is no smaller than the time constant of the filtered temperature signal Tlf as a function of the air mass. This ensures that the system settles aperiodically when the temperature is changed. For this reason, the change of the time constant should be a function of the air mass.

One specific embodiment of the present invention is particularly advantageous, in which the sensing element signal or a signal derived therefrom is recursively used or differentiated. According to such a specific embodiment of the present invention it is possible in the step of ascertaining, in particular, to differentiate the sum signal, in order to obtain a differentiated sum signal, and the temperature of the gas being ascertained at least on the basis of an additional sum signal from a sum of the sum signal and the differentiated sum signal.

The temperature of the gas may be particularly precisely determined if thermal material parameters of components of the gas flowing past the sensing element may be resorted to. In this respect, it is possible according to one particularly advantageous specific embodiment of the present invention to ascertain the temperature of the gas in the step of ascertaining using a piece of information about a composition or at least one component of the gas.

The present invention is explained by way of example in greater detail below with reference to the appended drawings.

BRIEF DESCRIPTION OF THE DRAWINGS

FIG. 6 shows a block diagram for explaining the filtering of the sensing element signal for improving the settling behavior of a measuring system presented herein.

FIG. 7A shows a diagram for explaining the temperature curves when utilizing an exemplary embodiment of the method for determining the temperature of a gas presented herein.

DETAILED DESCRIPTION

Figure 1:
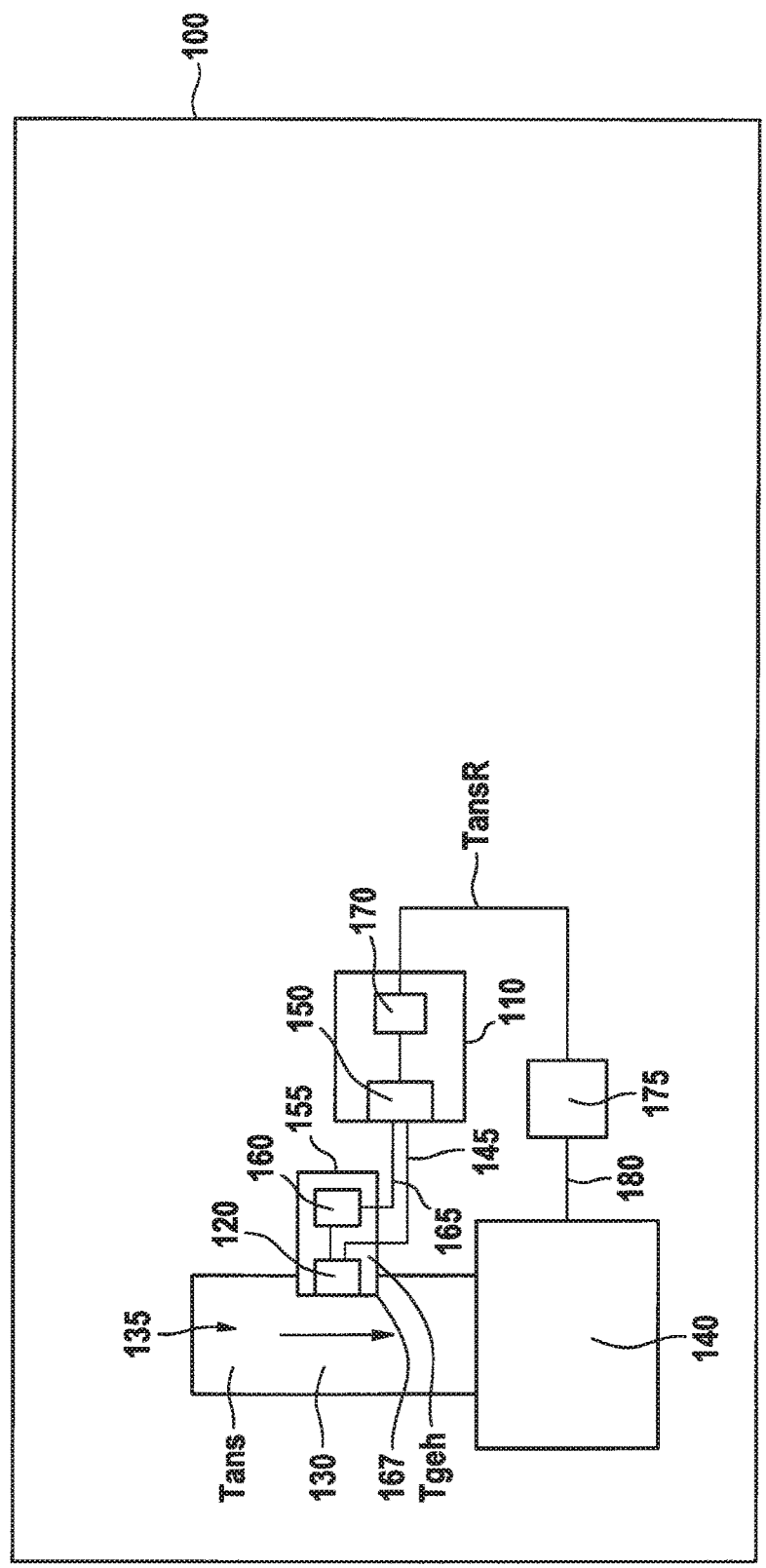
FIG. 1 shows a block diagram of a vehicle, in which an exemplary embodiment of a device for determining a temperature of a gas flowing past a sensing element is used.

In the following description of advantageous exemplary embodiments of the present invention, identical or similar reference numerals are used for elements which are represented in the various figures and act similarly, a repeated description of these elements being omitted.

FIG. 1 shows a block diagram of a vehicle 100, in which one exemplary embodiment of a device 110 for determining an (actual) temperature Tans of a gas 130 flowing past a sensing element 120 is used. Sensing element 120 in this case is situated in an air intake duct 135 of intake air (as gas) for an internal combustion engine 140 of vehicle 100. Sensing element 120 delivers a sensing element signal 145 to an interface 150 of device 110, this sensing element signal 145 itself representing a temperature of sensing element 120, around which gas 130 flows. Sensing element 120 is also attached to a housing 155, a housing sensor 160 also being provided, which detects a temperature of housing 155 and outputs a housing signal 165 representing this temperature of housing 155. Housing 155 is heated by the engine and electrical power dissipation of the sensor electronics, and around which gas 130 may at least partially flow and, therefore, may also be heated or cooled by gas 130. Housing signal 165 is also read in via interface 150 of device 110 for determining the temperature. Sensing element 120 and housing sensor 160, as well as associated housing 155 may, as thermosensor 167, be a component of an additional sensor, which measures, for example, one or multiple parameters of the intake air or of gas 130 such as, for example, the amount or the velocity of gas 130 which flows through intake duct 135.

The signals read in by interface 150, i.e., sensing element signal 145 and housing signal 165, are fed to a unit for ascertaining 170, which determines, i.e., calculates, the temperature of gas 130 (in this case, the intake air) using sensing element signal 145 and housing signal 165, and outputs it as corresponding signal TansR. This signal, which represents this temperature Tans of gas 130, is then fed to an engine control unit 175, which ascertains, for example, a desired change of the fuel mixture to be fed to internal combustion engine 140 or a changed injected fuel quantity into one or multiple components of internal combustion engine 140. This change of the fuel mixture to be fed to internal combustion engine 140, or changed injected fuel quantity into one or multiple components of internal combustion engine 140, may now be transmitted from engine control unit 175 to internal combustion engine 140 via a corresponding control signal 180. As a result, it is possible to control or regulate internal combustion engine 140. In this way, an optimal effectiveness and fuel utilization by internal combustion engine 140 may be achieved.

The thermal coupling of sensing element 120 with housing 155 leads to a thermal temperature divider, whose divider ratio changes as a function of the air velocity, so that the result of the Tans measurement (Tans=intake air temperature) changes with the air mass and with the difference between housing temperature Tgeh (Tgeh=housing temperature) and Tans. This results, in particular in the case of small air masses and large temperature differences between Tans and Tgeh, in intolerable deviations, which subside again only when Tgeh has adapted to Tans.

Figure 2:
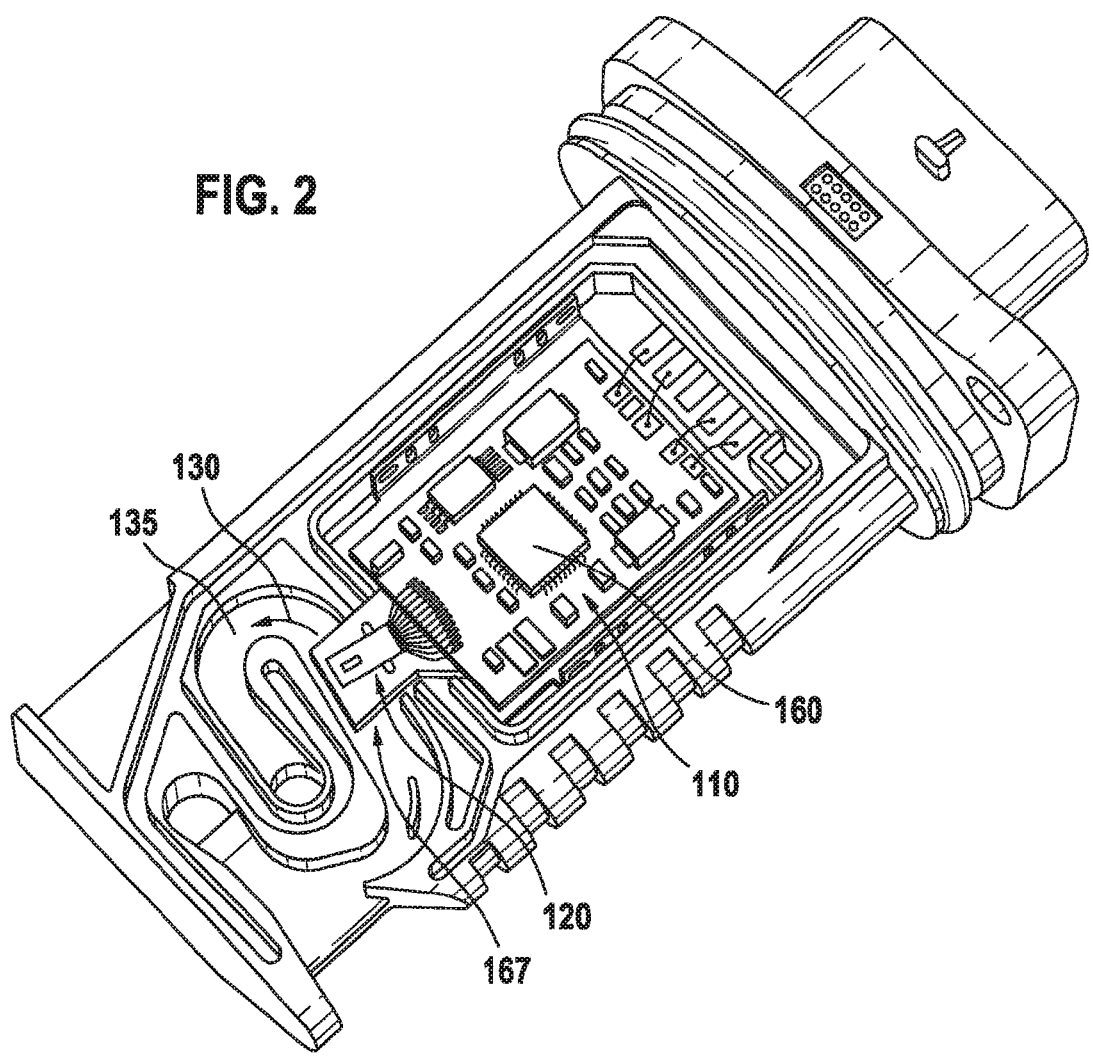
FIG. 2 shows a perspective view of a thermosensor including a device for determining a temperature of a gas flowing past a sensing element.

FIG. 2 shows a perspective view of a thermosensor 167, including intake air duct 135, sensing element 120, as well as device 110 for determining the temperature of gas 130. Housing sensor 160 is not explicitly depicted in FIG. 2. It is located in the ASIC TLF100 in the middle of the circuit board.

Figure 3:
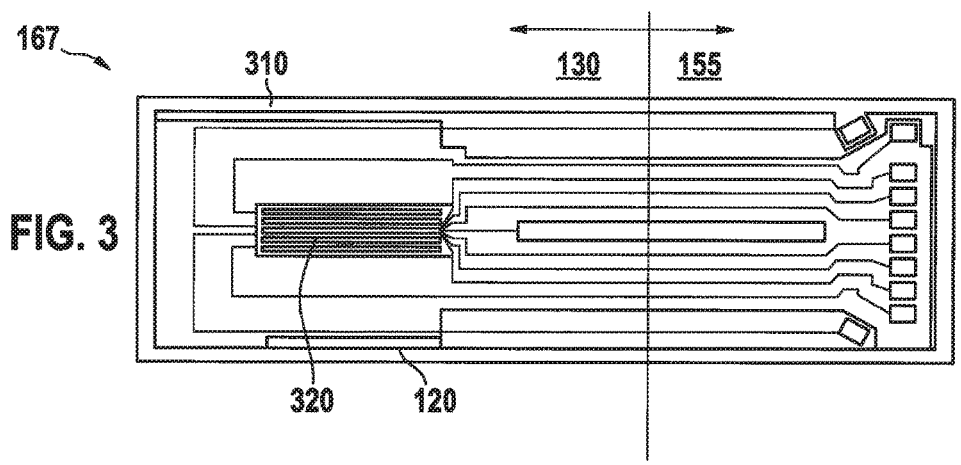
FIG. 3 shows a representation of a thermosensor for use in conjunction with the present invention.

FIG. 3 schematically shows a representation of air mass sensor 167 including sensing element 120. Here it is apparent that sensing element 120 is located outside housing 155 on a support element 310 and projects into the flow of intake air 130. Air mass sensor 167 includes a heated diaphragm 320 in order to enable air mass measurements in different temperature scenarios, and to thus be able to compensate for potentially occurring measuring errors. Sensing element 120 also includes a temperature-dependent resistance Rlf, which detects a heat flow or a time-related heat curve of sensing element 120 in the case of a temperature change of gas 130 flowing past the sensing element.

Support element 310 is flatly glued in housing 155 on a side opposite to sensing element 120, so that sensing element 120 has a thermal connection to housing 155.

Figure 4A:
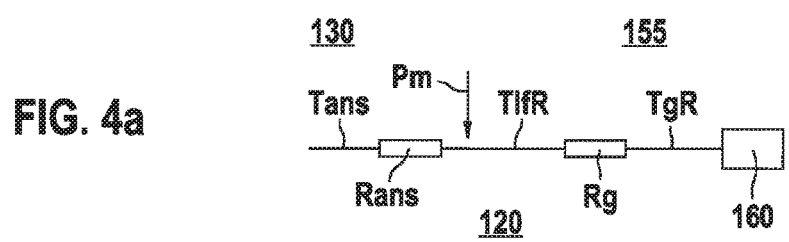
FIG. 4A shows a substitute circuit diagram for explaining the progression of a heat flow according to one exemplary embodiment of the present invention.
Figure 4B:
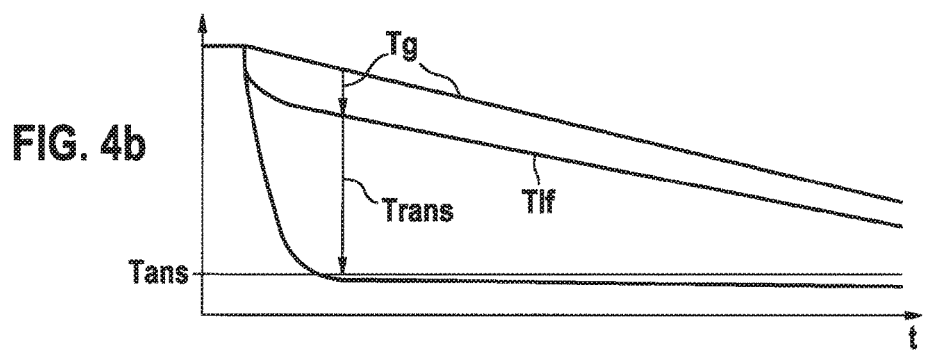
FIG. 4B shows a diagram for representing the temperature curves at different positions of a thermosensor for use in an exemplary embodiment of the present invention.

FIG. 4 shows a schematic representation in partial FIGS. 4A and 4B of the procedure for determining the temperature of the gas. In FIG. 4A, a path of a heat flow from gas 130 past sensing element 120 into housing 155 is schematically indicated. On the left side of FIG. 4A, gas 130 is depicted with the temperature Tans, which is guided in a heat flow via a thermal resistance Rans (which may be a function of different parameters Pm) to sensing element 120, which has the temperature TlfR. From sensing element 120, a heat flow flows via thermal resistance Rg of the housing to housing sensor 160, which measures a temperature TgR.

Temperature Tans may then be ascertained utilizing the following correlation:

$$Tans=TlfR+(TlfR-TgR)*FR-Pm*Rans,$$

or $$Tans=TlfR+(TlfR-TgR)*FR-Pm*Rg*FR,$$

where $$FR=Rans(LM, Tans)/Rg$$

$$Pm=f(LM, Tlf) \text{ applies}$$

and $dTm=Pm*Rg*FR=Pm*Tans$ applies (where dTm represents the temperature offset and FR represents the divider ratio of the temperature divider).

LM is the air mass in [kg/h], which is drawn in by the engine and which is measured by sensor CMF. For this purpose, a diaphragm (Si-oxide 2 µm thick) is heated. The cooling as a result of the moving air upsets the temperature profile of the diaphragm and, therefore, a resistor bridge made of temperature-dependent resistors situated on the diaphragm. The bridge voltage is evaluated as an air mass signal.

Pm is the heat output (thermal output), which flows from the diaphragm to the CMF chip (Si: 0.4 mm thick) and produces a temperature offset dTm in air sensor Rlf, which overlays the temperature divider. For this reason, this offset must be subtracted when calculating TansR. The back calculation with the thermal divider can only be carried out without this influence. The typical dTm is ascertained empirically via measurement and, if needed, part-specifically adjusted via measurement of electric characteristics.

Here, the ascertained temperature of gas TansR should correspond quite precisely to the actual temperature of the gas.

Here, Tans defines the intake air temperature (as it really is) and TansR defines the computed intake air temperature (the result of our evaluation); R in this case stands for calculation.

FIG. 4B shows a temperature curve over time in the case of a temperature drop between housing temperature Tg and the (cooled) intake air temperature Tans. In this case, it is apparent that housing temperature Tg approaches rather slowly a level of intake air temperature Tans and, as a result of the spatial proximity of sensing element 120 to the housing, the temperature of sensing element Tlf also follows rather slowly the temperature drop of the intake air.

Figure 5:
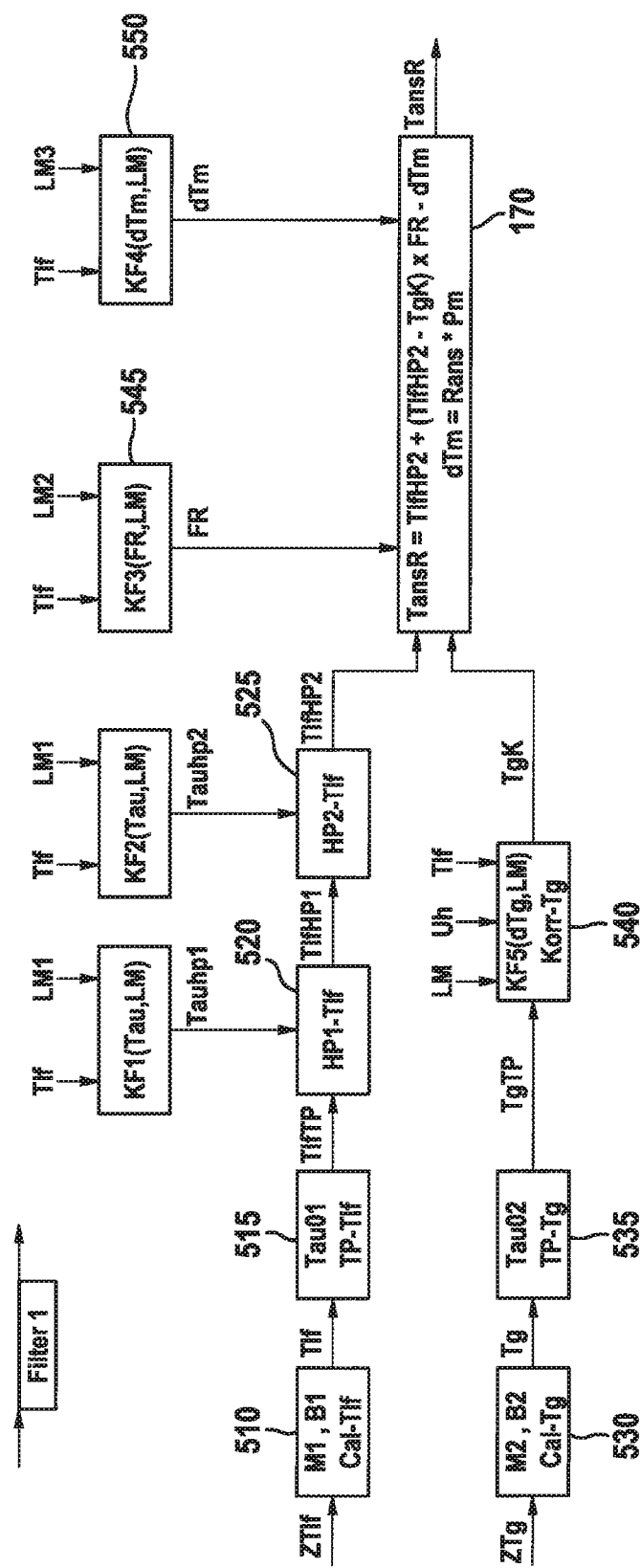
FIG. 5 shows a block diagram of different processing modules for implementing the approach provided herein.

FIG. 5 schematically shows a representation of a procedure for determining temperature TansR of the gas. In a first processing module 510, the sensing element or the temperature value of the sensing element is initially calibrated using variables B1 and M1. Mx is the slope adjustment and Bx is the offset adjustment of the temperature measurements. Subsequently thereto, a second processing module 515 is carried out, in which a low-pass filtering of the signal delivered by sensing element 120 (sensing element signal 145, Tlf) is carried out. Subsequently thereto, low-pass filtered sensing element signal TlfTP is subject to a first high-pass filtering in another processing module 520 (this first high-pass filtering being a function of parametersLM and Tlf) and thereafter subjected to a second low-pass filtering in another processing module 525, this second high-pass filtering also being a function of parameters LM and Tlf. The signal resulting from this is provided as TlfHP2 to the unit for ascertaining 170.

In a second processing branch, housing sensor 160 and housing signal 165 or Tg are initially calibrated in a first processing module 530, whereupon a low-pass filtering of housing signal Tg to a signal TgTP occurs in a subsequent processing module 535, and an adjustment of low-pass filtered housing signal TgTP to an adjusted housing signal TgK occurs in another processing module 540, taking into account variables LM, Uh and Tlf. Adjusted housing signal Tgk is now also used for determining temperature TansR of the gas, for example, using the correlation indicated in unit 170. For this purpose, a value FR according to the foregoing description from an FR determination unit 545 and a value dTm from a dTm determination unit 150 are used by unit 170. Variable dTm refers in this case to dTm as the temperature offset of Tlf caused by Pm.

The aim of the approach provided herein is to compensate for the influence of the housing temperature and the settling time constant during temperature changes of Tans. This is to be achieved via static and dynamic compensation of an air sensor signal including the sensing element.

The temperature sensor used here is used together with a dynamic compensation (flank steepening) having a constant time constant.

One important aspect of the present invention may be seen in compensating for the housing temperature influence and for the settling time constant during temperature changes of Tans. The result is an air temperature signal TansR, whose settling time is reduced to a ⅓ to ¼, and which displays the value of Tans in the settled state independently of the temperature difference dT=Tgeh−Tans. The compensation is adapted via air mass and Tans.

Thus, in order to compensate for a temperature divider, the housing temperature should be detected. This is implemented in thermosensor 167 presented herein by a temperature detection unit or temperature determination unit integrated herein in evaluation-IC 170. In the process, an analog temperature signal (in this case the silicon temperature of sensing element 120) is digitized and calibrated in the adjustment process. The calibrated signal represents the housing temperature and is fed to a processor (DPS) 170 for further offsetting. This results in a temperature divider from $$Tans \rightarrow Rtans \rightarrow Tlf \rightarrow Rgeh \rightarrow Tgeh$$

Rgeh is the resulting thermal resistance between the temperature measuring point Tlf and the temperature measuring point Tgeh. The value of Rgeh is determined by the mechanical configuration (shape and material). Rtans is the thermal resistance between Tans and the likewise digitized and calibrated temperature measuring point Tlf. Rtans is determined by the air velocity and the flow behavior at the CMF surface and by the material values (Tans-dependent) of the air. If Rtans, Rgeh, Tgeh and Tlf are known, the temperature divider may be resolved toward Tans. However, the divider is disrupted by the heat input of the heated air mass measuring diaphragm. This should be taken into account when computing TansR. The heat input is a function of the air mass (air velocity), of the Tlf-controlled diaphragm temperature and of the thickness of the diaphragm.

The compensation of the temperature divider, upon perfect adaptation of the adjustment parameters, results in an adjusted TansR in the settled state. However, the duration of the settling process during a temperature change of the air depends on the thermal time constant of the Tlf signal (CMF chip). A more rapid TansR, if desired, may be achieved by a filter circuit (flank steepening in thermosensor 167). For this purpose (as in the representation from the block diagram of FIG. 1), Tlf is mathematically differentiated (high pass) and the result is added to Tlf. This process may be repeated in multiple stages, as is depicted in FIG. 6 in one-time repetition. To avoid an overshooting, the time constant of each high pass should be adapted to the time constant of the previous stage. The main influence of this adaptation is the air mass (air velocity Rtans).

FIG. 7A shows a diagram of an air temperature change from 80° C. to 22° C. in an intake air volume of 120 kg/h flowing past the sensing element, the time being depicted on the x-axis and the temperature and curves being depicted on the y-axis, and a temperature curve of housing temperature Tgeh, a temperature curve of temperature Tlf of the sensing element and an actual temperature curve of temperature Tans of the intake air being depicted as measured curves. In FIG. 7A, a curve is also plotted, which represents temperature TansR ascertained with the approach presented herein. It is apparent from FIG. 7A that the temperature of the gas (i.e., in this case the intake air), ascertained with the approach presented herein, exhibits a rapid settling behavior, so that ascertained temperature TansR of the gas rapidly achieves a very realistic value.

Figure 7B:
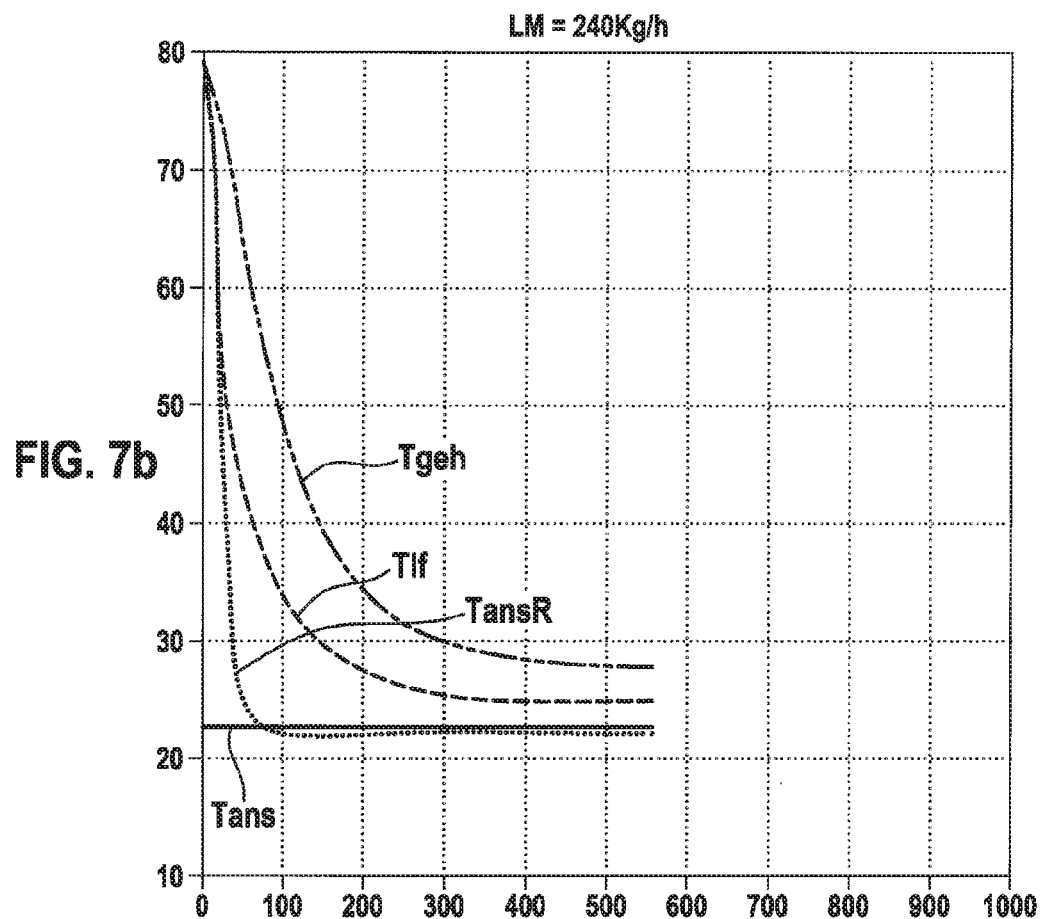
FIG. 7B shows an additional diagram for explaining the temperature curves when utilizing an exemplary embodiment of the method for determining the temperature of a gas presented herein.

In FIG. 7B, the same curve progressions as in FIG. 7A are plotted in an identical coordinate system, the curves now depicting measured values or ascertained values in an intake air volume of 240 kg/h flowing past the sensing element. It is apparent that now, as a result of the larger volume of air flowing past the sensing element, a significantly more rapid adaptation of the measured values or ascertained values to the real temperature of the intake air takes place.

Figure 8:
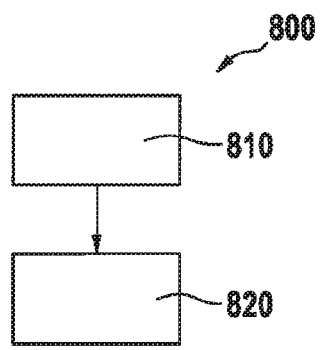
FIG. 8 shows a flow chart of a method according to one exemplary embodiment of the present invention.

FIG. 8 shows a flow chart of a method 800 for determining a temperature of a gas flowing past a sensing element. Method 800 includes a step 810 of reading in a sensing element signal and a housing signal, the sensing element signal representing a temperature of the sensing element and the housing signal representing a temperature of the housing. Method 800 also includes a step 820 of ascertaining the temperature of the gas using the sensing element signal, the housing signal and a previously known thermal resistance of the housing as a function of a material and/or a shape of the housing.

The exemplary embodiments described and shown in the figures are selected merely by way of example. Different exemplary embodiments may be combined with one another entirely or with respect to individual features. One exemplary embodiment may also be supplemented by features of another exemplary embodiment.

In addition, method steps according to the present invention may be repeated or carried out in a sequence other than that described.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for determining a temperature of a gas flowing past a sensing element, the method comprising:
   reading in a sensing element signal and a housing signal, the sensing element signal representing a temperature of the sensing element and the housing signal representing a temperature of a housing in or on which the sensing element is situated; and
   ascertaining the temperature of the gas, wherein the ascertaining is based on (a) a thermal resistance of the housing as a function of at least one of (a) a material of the housing and (b) a shape of the housing, (b) the sensing element signal, and (c) the housing signal.

2. The method of claim 1, wherein, in the ascertaining, the temperature of the gas is ascertained additionally based on a thermal resistance that is a function of a flow parameter of the gas flowing past the sensing element.

3. The method of claim 1, wherein the ascertaining includes filtering the sensing element signal using a time constant of a differentiating function, the time constant being a function of an air mass.

4. The method of claim 1, wherein in the ascertaining, the temperature of the gas is ascertained using a piece of information about a composition or at least one component of the gas.

5. The method of claim 1, wherein the ascertaining includes filtering the sensing element signal.

6. The method of claim 1, wherein the ascertaining includes processing the sensing element signal with a high-pass filter.

7. The method of claim 1, wherein the ascertaining includes differentiating the sensing element signal to obtain a differentiated sensing element signal, and the temperature of the gas is ascertained based on a sum signal from a sum of the sensing element signal and the differentiated sensing element signal.

8. The method of claim 7, wherein in the ascertaining, the sum signal is differentiated, to obtain a differentiated sum signal, and the temperature of the gas is ascertained at least based on an additional sum signal from a sum of the sum signal and the differentiated sum signal.

9. The method of claim 1, wherein, in the ascertaining, the temperature of the gas is ascertained using an empirically ascertained temperature offset at the sensing element.

10. The method of claim 9, wherein the temperature offset is a function of an air mass.

11. The method of claim 9, wherein the temperature offset is a function of a temperature of the sensing element.

12. The method of claim 1, wherein, in the ascertaining, the temperature is ascertained additionally based on a thermal resistance of the gas flowing past the sensing element.

13. The method of claim 12, wherein in the ascertaining, the temperature of the gas is ascertained using the thermal resistance, which is a function of a flow parameter of the gas flowing past the sensing element.

14. The method of claim 13, wherein the reading includes reading in the flow parameter of the gas flowing past the sensing element, and the ascertaining includes ascertaining the temperature of the gas as a function of the read in flow parameter of the gas.

15. The method of claim 12, wherein in the ascertaining, the temperature of the gas is ascertained using the thermal resistance, which is a function of a velocity of the gas flowing past the sensing element.

16. The method of claim 15, wherein the reading includes reading in the velocity, and the ascertaining includes ascertaining the temperature of the gas as a function of the read in velocity.

17. A device for determining a temperature of a gas flowing past a sensing element, comprising:
   an interface for reading in a sensing element signal and a housing signal, the sensing element signal representing a temperature of the sensing element and the housing signal representing a temperature of a housing, the sensing element being in or on the housing; and
   a unit for ascertaining the temperature of the gas, wherein the ascertaining is based on (a) a thermal resistance of the housing as a function of at least one of (a) a material of the housing and (b) a shape of the housing, (b) the sensing element signal, and (c) the housing signal.

18. A non-transitory computer readable medium having a computer program comprising:
   a program code arrangement having program code executable by a processor for determining a temperature of a gas flowing past a sensing element that is in or on a housing, by performing the following:
   reading in a sensing element signal and a housing signal, the sensing element signal representing a temperature of the sensing element and the housing signal representing a temperature of the housing; and
   ascertaining the temperature of the gas, wherein the ascertaining is based on (a) a thermal resistance of the housing as a function of at least one of (a) a material of the housing and (b) a shape of the housing, (b) the sensing element signal, and (c) the housing signal.

* * * * *